(12) United States Patent
Persson

(10) Patent No.: US 10,747,681 B1
(45) Date of Patent: Aug. 18, 2020

(54) INVALIDATION OF ENTRIES IN ADDRESS TRANSLATION STORAGE

(71) Applicant: Arm Limited, Cambridge (GB)

(72) Inventor: Håkan Lars-Göran Persson, Bjärred (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/356,016

(22) Filed: Mar. 18, 2019

(51) Int. Cl.
*G06F 12/10* (2016.01)
*G06F 12/1018* (2016.01)
*G06F 12/0891* (2016.01)
*G06F 12/1045* (2016.01)
*G06F 12/0808* (2016.01)

(52) U.S. Cl.
CPC ...... *G06F 12/1018* (2013.01); *G06F 12/0808* (2013.01); *G06F 12/0891* (2013.01); *G06F 12/1063* (2013.01)

(58) Field of Classification Search
CPC ............. G06F 12/1018; G06F 12/0808; G06F 12/0891; G06F 12/1063
USPC ........................................................ 711/216
See application file for complete search history.

(56) References Cited

U.S. PATENT DOCUMENTS

2019/0018777 A1\* 1/2019 Swaine ............... G06F 12/1036

\* cited by examiner

*Primary Examiner* — Hua J Song
(74) *Attorney, Agent, or Firm* — Nixon & Vanderhye P.C.

(57) ABSTRACT

Apparatuses and methods for address translation invalidation are provided. In an apparatus having address translation storage which stores merged address translation information for multiple address translation stages, a set of counters are provided to hold a set of counter values. Entries in the address translation storage are stored with identifiers of first and second counters selected from the set of counters in dependence on respective context information for a first stage and a second stage of address translation together with a counter value of each counter. In response to an invalidation request specifying a first or second addressing scheme invalidation context a counter of the set of counters is selected in dependence on the first or second addressing scheme invalidation context and its value is modified. Subsequently an entry in the address translation storage is determined to be invalid when either the first counter value does not match a current value of the first counter or the second counter value does not match a current value of the second counter.

20 Claims, 10 Drawing Sheets

INVALIDATION OF ENTRIES IN ADDRESS TRANSLATION STORAGE

TECHNICAL FIELD

The present invention relates to data processing. More particularly the present invention relates to the invalidation of stored address translations in a data processing apparatus.

DESCRIPTION

Address translation is a technique used in data processing devices to allow different components of the data processing system to use different addressing schemes. Commonly a master device such as a CPU uses a virtual addressing scheme, whilst other slave devices in the data processing system use a physical addressing scheme. The mappings between virtual addresses and physical addresses are defined and stored in memory, but to avoid the access latency associated with retrieving a given mapping from the memory every time it is required, a small subset of these mappings may be temporarily stored closer to the master device. Such an address translation storage may be provided by a Translation Lookaside Buffer (TLB). When the address translation mappings are updated it is necessary to invalidate any mappings stored in the local address translation storage (e.g. in a TLB).

Such translations between different addressing schemes may however not only take the place between two addressing schemes (e.g. between virtual addresses and physical addresses), but rather multiple stages of address translation may take place. For example, an operating system may manage one set of mappings from virtual addresses (VAs) to intermediate physical addresses (IPAs), and a hypervisor then manages mappings from the IPAs to physical addresses (PAs). Although it is possible to support the local caching of address mappings for this arrangement using two separate address translation storage devices (e.g. TLBs), one caching virtual address to intermediate physical address (VA2IPA) mappings and one caching intermediate physical address to physical address (IPA2PA) mappings, the mappings may be folded together and a single local storage device used to cache direct virtual address to physical address (VA2PA) mappings. This avoids the greater area occupied in a data processing system by two distinct address translation storage devices and avoids the latency associated with performing separate lookups in two address translation storage devices. However, when the address translation mappings for at least two stages of address translation are merged this adds complexity to the process of invalidating entries in the address translation storage when address translation mappings are updated. For example, when hypervisor controlled IPA2PA mappings are updated, the hypervisor does not know the virtual addresses used for the mapping and thus cannot easily find the specific TLB entry or entries to invalidate using the virtual address. Further, virtual address mappings may be specified in terms of a mapped region, the size of which can vary, which adds an additional constraint to the invalidation operation when mappings from different translation levels are merged, because the mappings may not be the same size, e.g. the VA2IPA mapping may be for a considerably smaller region size than that of the IPA2PA mapping. In such a case, there may be multiple TLB entries created from the same IPA2PA mapping and all of them must be found and invalidated. Equally if the IPA2PA mapping region is smaller than the VA2IPA mapping region then multiple TLB entries may be created from the same VA2IPA mapping, and when an invalidation is requested for the VA2IPA mapping all the TLB entries derived from the mapping must be validated.

Generally, one possible approach taken to this situation may be to invalidate all TLB entries in response to any invalidation request, but this can have a significant performance impact in particular as several serialised memory transactions may be required to resolve a received address translation request (i.e. VA2PA mapping) when a TLB miss subsequently necessarily occurs in a fully invalidated TLB. Similarly, a typical approach to updating a virtual memory mapping is for the master to update the mapping entry, issue an invalidation of the TLB, and then wait for the invalidation to complete before continuing. If the invalidation takes a long time, then this can have a noticeable performance impact. Other approaches may for example (in the context of the update of hypervisor controlled IPA2PA mappings) perform more laborious searches for all TLB entries to invalidate all TLB entries for the IPA2PA context or additionally store the IPA address of mappings in the TLB as well as the VA and PA. This latter approach allows specific entries to be invalidated by IPA, but comes at the cost of significant extra storage.

SUMMARY

In example embodiments described herein there is an apparatus comprising:

address translation circuitry to perform first address translations from a first addressing scheme to a second addressing scheme and to perform second address translations from the second addressing scheme to a third addressing scheme;

address translation storage comprising multiple entries, each entry to store merged address translation information, wherein the merged address translation information indicates an input address region of the first addressing scheme and an output address region of the third addressing scheme; and counter circuitry comprising a set of counters to hold a set of counter values, wherein the address translation circuitry is arranged, when creating an entry in the address translation storage, to store the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and to store the entry comprising a first counter value of the first counter and a second counter value of the second counter, wherein the address translation circuitry is responsive to a first addressing scheme invalidation request specifying a first addressing scheme invalidation context to modify the value of at least one counter of the set of counters in dependence on the first addressing scheme invalidation context and is responsive to a second addressing scheme invalidation request specifying a second addressing scheme invalidation context to modify the value of at least one counter of the set of counters in dependence on the second addressing scheme invalidation context, and wherein the address translation circuitry is responsive to a validity check trigger to perform a validity check process in which the entry in the address translation storage is determined to be invalid when either the first counter value does not match a current value of the first counter or the second counter value does not match a current value of the second counter.

In example embodiments described herein there is a method of address translation comprising:

performing first address translations from a first addressing scheme to a second addressing scheme and performing second address translations from the second addressing scheme to a third addressing scheme;

storing multiple entries in address translation storage, each entry to store merged address translation information, wherein the merged address translation information indicates an input address region of the first addressing scheme and an output address region of the third addressing scheme;

holding a set of counter values in a set of counters;

when creating an entry in the address translation storage, storing the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and storing the entry comprising a first counter value of the first counter and a second counter value of the second counter;

in response to a first addressing scheme invalidation request specifying a first addressing scheme invalidation context modifying the value of at least one counter of the set of counters in dependence on the first addressing scheme invalidation context and in response to a second addressing scheme invalidation request specifying a second addressing scheme invalidation context modifying the value of at least one counter of the set of counters in dependence on the second addressing scheme invalidation context; and in response to a validity check trigger performing a validity check process in which the entry in the address translation storage is determined to be invalid when either the first counter value does not match a current value of the first counter or the second counter value does not match a current value of the second counter.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
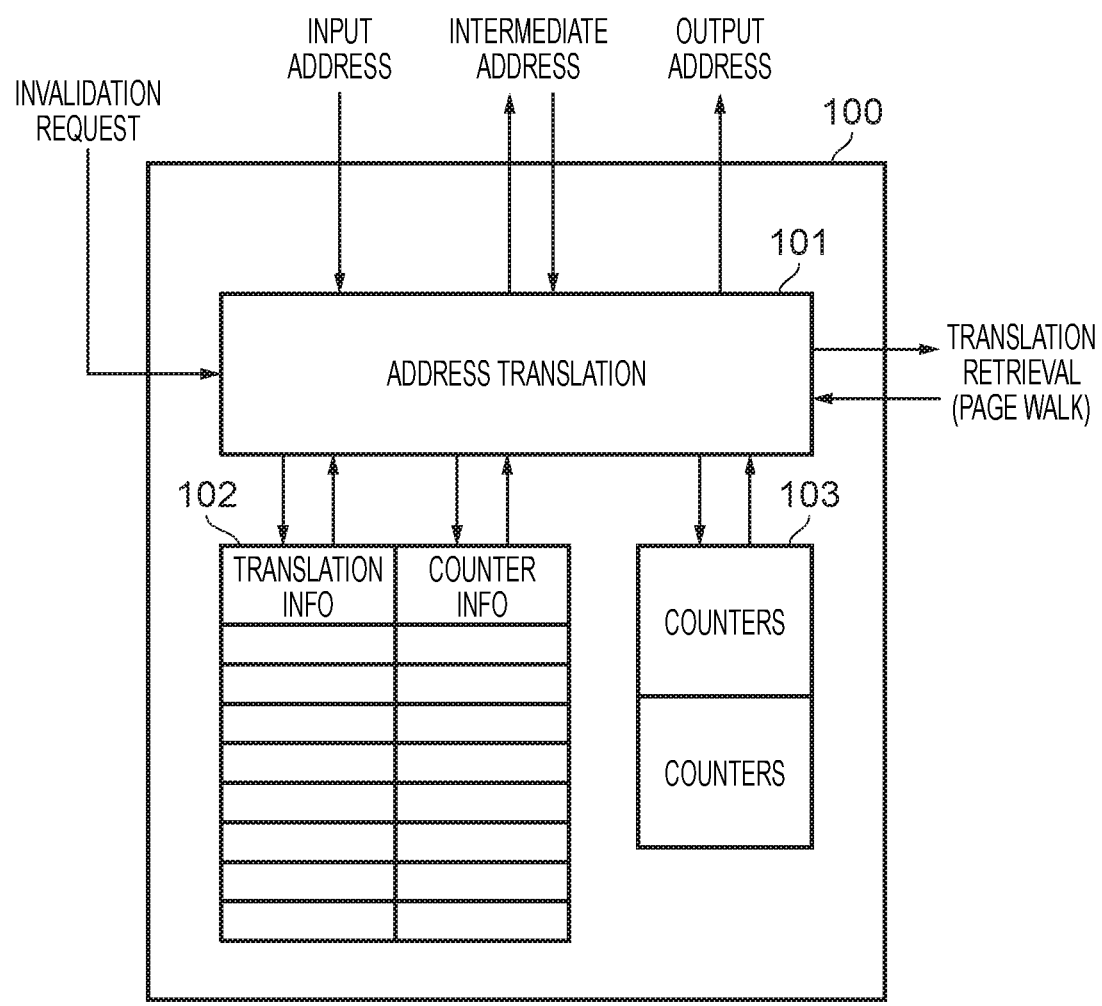
FIG. 1 schematically illustrates an apparatus comprising address translation circuitry and address translation storage in an example embodiment.

Before discussing the embodiments with reference to the accompanying figures, the following description of embodiments is provided.

In accordance with one example configuration there is provided an apparatus comprising: address translation circuitry to perform first address translations from a first addressing scheme to a second addressing scheme and to perform second address translations from the second addressing scheme to a third addressing scheme; address translation storage comprising multiple entries, each entry to store merged address translation information, wherein the merged address translation information indicates an input address region of the first addressing scheme and an output address region of the third addressing scheme; and counter circuitry comprising a set of 2 counters to hold a set of counter values, wherein the address translation circuitry is arranged, when creating an entry in the address translation storage, to store the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and to store the entry comprising a first counter value of the first counter and a second counter value of the second counter, wherein the address translation circuitry is responsive to a first addressing scheme invalidation request specifying a first addressing scheme invalidation context to modify the value of at least one counter of the set of counters in dependence on the first addressing scheme invalidation context and is responsive to a second addressing scheme invalidation request specifying a second addressing scheme invalidation context to modify the value of at least one counter of the set of counters in dependence on the second addressing scheme invalidation context, and wherein the address translation circuitry is responsive to a validity check trigger to perform a validity check process in which the entry in the address translation storage is determined to be invalid when either the first counter value does not match a current value of the first counter or the second counter value does not match a current value of the second counter.

The present techniques are concerned with address translation circuitry which supports (at least) two stages of address translation, namely from a first addressing scheme to a second addressing scheme and from the second addressing scheme to a third addressing scheme. Such addressing schemes may for example be virtual addressing, intermediate physical addressing and physical addressing. Further, the present techniques are concerned with address translation storage (for example in the form of a TLB within a memory management unit (MMU)), in which a single entry merges address translation information from those two stages of translation. Specifically, this may be arranged such that receipt of addressing information relating to the first addressing scheme allows the address translation circuitry, with reference to the address translation storage, to directly provide third addressing scheme information in response. Associated with the address translation storage and the address translation circuitry, the present techniques provide counter circuitry comprising a set of counters, each to hold a counter value.

The address translation circuitry makes use of the counters of the counter circuitry, firstly when creating an entry in the address translation storage to additionally store identifiers of first and second counters, wherein each is selected in dependence on context information for the respective stage of translation, i.e. a first counter is selected in dependence on first context information relating to translation of an address or addresses from the first addressing scheme into the second addressing scheme, whilst the identifier of the second counter is selected in dependence on second context information relating to the translation of an address or addresses of the second addressing scheme into the third addressing scheme. Further, the respective values held by the first and second counters are stored in the entry. The address translation circuitry is then responsive to an invalidation request to modify the value of at least one counter of the set of counters, depending on the addressing scheme invalidation context to which the invalidation request relates. For example, the value of the counter may be incremented (although equally some embodiments may be based on decrementing counters). Accordingly, responsive to a first addressing scheme invalidation request the address translation circuitry modifies the value of at least one counter in dependence on the first addressing scheme invalidation context and in response to a second addressing scheme invalidation request modifies the value of at least one counter of the set of counters in dependence on the second addressing scheme invalidation context. This then means that for a given entry in the address translation circuitry, when either of the mappings used to generate it are updated, the corresponding counter or counters will no longer hold the same value that was stored in that entry when the entry was created. This feature is then made use of by the address translation circuitry in response to a validity check trigger to examine entries in the address translation storage and to explicitly invalidate entries when either the first counter value stored in the entry does not match the current value of that first counter or the second counter value stored in the entry does not match the current value of the second counter. The validity check trigger may take a variety of forms, as appropriate to the frequency with which such a validity check is required in an implemented system for such checks to be carried out, but may for example comprise a lookup being performed by the address translation circuitry in response to a translation request, may be part of an internal processing cycle relating to the address translation circuitry to perform a regular "clean up" (garbage collection) with respect to entries of the address translation storage, or may be in response to any other defined condition.

In some embodiments the counter circuitry comprises a single set of counters from which both the first counter and the second counter are selected, this being done in dependence on the respective first context information and second context information. However, in other embodiments the counter circuitry comprises a first set of counters to hold a set of first counter values and a second set of counters to hold a set of second counter values, and wherein the address translation circuitry is arranged, when creating the entry in the address translation storage, to store the entry comprising the identifier of the first counter selected from the first set of counters in dependence on the first context information and the identifier of the second counter selected from the second set of counters in dependence on the second context information. Thus, in such embodiments the first counter can only be selected from the first set of counters and the second counter can only be selected from the second set of counters. The two sets of counters may be the same as one another or, as such embodiments allow, be indirectly set up in number and in counter range.

In some embodiments, separate sets of counters can be used for each translation stage for different region sizes of address mapping which may be defined at each respective translation stage. Accordingly, in some embodiments the counter circuitry comprises a plurality of sets of counters, each to hold a set of counter values, wherein each set of counters corresponds to a region size defined for translation from the first addressing scheme to the second addressing scheme or for translation from the second addressing scheme to a third addressing scheme.

The first context information may take a variety of forms depending on the particular manner in which the first addressing scheme information and second addressing scheme information are specified, and what associated information is available relating to the respective addressing schemes, the nature of the device specifying them, the data processing context, and so on. In some embodiments the first context information comprises a first region size of the input address region of the first addressing scheme. In some embodiments the second context information comprises a second region size of the intermediate address region of the second addressing scheme. Accordingly, for either or both of the selections of the first and second counters, a first region size of the input address region of the first addressing scheme specified may be used as at least part of the selection of the first counter and/or a second region size of the intermediate address region of the second addressing scheme may be used as at least part of the selection of the second counter.

In some embodiments the first context information comprises a first addressing scheme base address of the input address region. In some embodiments the second context information comprises a second addressing scheme base address of the intermediate address region.

In some embodiments the first context information comprises at least one of: a virtual machine identifier and an application space identifier corresponding to the translation of the input address region of the first addressing scheme into the intermediate address region of the second addressing scheme. In some embodiments the second context information comprises a virtual machine identifier corresponding to the translation of the intermediate address region of the second addressing scheme into the output address region of the third addressing scheme. A virtual machine identifier (VMID) and/or an application space identifier (ASID) may form part of the first context information and therefore be used in the selection of the first counter. Similarly, as an alternative or in addition, the second context information may comprise a VMID which may be used in the selection of the second counter.

The particular manner in which the first and second counters are selected in dependence on the first context information and the second context information respectively may be variously defined, depending on what information for each is available, and what may be determined to be of particular use in a given implementation. However, in some embodiments the address translation circuitry is arranged, when creating the entry, to generate a first hash value of the first context information and to select the first counter from the first set of counters in dependence on the first hash value, and wherein the address translation circuitry is arranged, when creating the entry, to generate a second hash value of the second context information and to select the second counter from the second set of counters in dependence on the second hash value. There are various ways in which these hash values may be generated, for example to calculate an XOR of some or all of the lookup information bits associated with the new entry being created.

It should be noted that, as mentioned above, although the present techniques are broadly been described with a respect to two stages of translation, the present techniques are not limited to only two stages of translation and more may be implemented. In such an implementation in some embodiments a shared set of counters may be used for some or all of the stages of translation. One particular context in which this counter sharing may occur is when multiple memory protection (identity translation) stages dependent on the physical address of a transaction are implemented. In such an example, rather than providing a counter for each of these (technically separate) stages of translation, a single counter could be selected for the entries in the address translation storage corresponding to the physical address.

Knowledge about a region size for an invalidation request can enable improved efficiency with respect to the invalidation of entries in the address translation storage to be achieved, when the invalidation request relates to the first addressing scheme and an associated first addressing scheme invalidation region size is provided. In particular, this is the case when the first addressing scheme invalidation region size is known to be the smallest possible first address translation region, such that this first address translation region cannot be split and always maps to a single address translation storage entry. In contemporary address translation apparatuses this may for example be a 4 kB invalidation region. Conversely, if the region size is known, but is larger, then it may have resulted in multiple entries in the address translation storage and each of those multiple potential entries must be invalidated. However, when the region size for the invalidation is the smallest defined region for the translations then the first addressing scheme region definition can simply be directly invalidated in the entry of the address translation storage and no modification of the counter values is required. Accordingly, in some embodiments, when the first addressing scheme invalidation context specifies a smallest defined first addressing scheme invalidation region size, the address translation storage is responsive to the first addressing scheme invalidation request to mark entries in the address translation storage comprised in the smallest defined first addressing scheme invalidation region size and as invalid and not to modify the value of the at least one counter of the set of counters.

In some embodiments the apparatus further comprises first addressing scheme region size storage to store a first addressing scheme largest region size, wherein the address translation circuitry is arranged, when creating the entry, to store the first region size in the first addressing scheme region size storage when the first region size is larger than a current first region size stored in the first addressing scheme region size storage, and the address translation circuitry is responsive to the first addressing scheme invalidation request to mark entries in the address translation storage comprised in the first addressing scheme largest region size as invalid and not to modify the value of the at least one counter of the set of counters.

In some embodiments, when the first addressing scheme invalidation context does not specify a first addressing scheme invalidation region size, the address translation circuitry is responsive to the first addressing scheme invalidation request to determine the at least one counter of the set of counters to have its value modified in dependence on each of multiple first region sizes of input address regions of the first addressing scheme defined for the first address translations. For example, when a region size is not specified in an invalidation request, the invalidation request is then carried out for all possible region sizes since all such corresponding entries could now be invalid.

In some embodiments, when the second addressing scheme invalidation context specifies a second addressing scheme invalidation region size, the address translation circuitry is responsive to the second addressing scheme invalidation request to determine the at least one counter of the set of counters to have its value modified in dependence on the second addressing scheme invalidation region size.

In some embodiments, when the second addressing scheme invalidation context does not specify a second addressing scheme invalidation region size, the address translation circuitry is responsive to the second addressing scheme invalidation request to determine the at least one counter of the set of counters to have its value modified in dependence on each of multiple second region sizes of intermediate address regions of the second addressing scheme defined for the second address translations. For example, when a region size is not specified in an invalidation request, the invalidation request is then carried out for all possible region sizes since all such corresponding entries could now be invalid.

In some embodiments the apparatus further comprises deferral circuitry to defer the value modification of the at least one counter of the set of counters and to defer the value modification of at least one counter of the set of counters until a counter synchronisation signal is received. The present techniques recognise that there may be circumstances in which several translation invalidations could be issued in rapid succession, and the provision of the deferral circuitry enables it to be avoided that a counter has its value modified (e.g. is incremented) many times in succession (since this is unnecessary in the sense that only one modification of the counter is required to invalidate the corresponding entries), instead this counter update being deferred until a predefined synchronisation signal is received.

In some such embodiments the deferral circuitry comprises a settable flag for each counter of the first set of counters and of the second set of counter, wherein the deferral circuitry is responsive to a counter modification signal from the address translation circuitry to set the settable flag for a respective counter, and wherein the deferral circuitry is responsive to the counter synchronisation signal to modify values of counters for which the settable flag is set. Accordingly, by the use of the settable flags for each counter the counters for which an update is pending can be marked and once the counter synchronisation signal is received this update can be implemented in a single step.

As mentioned previously, the validity check trigger may take a variety of forms. In some embodiments, the validity check trigger comprises a translation lookup request received by the address translation circuitry.

In some embodiments the validity check trigger comprises the modification of the value of the at least one counter of the set of counters, and the address translation circuitry is responsive to the validity check trigger to perform the validity check process for the multiple entries of the address translation storage.

In some embodiments each counter of the set of counters is arranged to wrap around, further comprising oldest counter value storage and starting counter value storage, wherein the address translation circuitry is responsive to the validity check trigger to store current values of the set of counters in the starting counter value storage before performing the validity check process, and wherein the address translation circuitry is responsive to completion of the validity check process for the multiple entries of the address translation storage to store content of the starting counter value storage as content of the oldest counter value storage. The finite size of each counter can therefore be allowed for, and in particular the wrap around of a finite counter, with reference to these stored counter values (oldest and starting).

In some embodiments the address translation circuitry is responsive to an overlap condition, in which modification of the value of a counter in response to an invalidation request would cause the counter to reach its respective value in the oldest counter value storage, to delay the response to the invalidation request until completion of the validity check process for the multiple entries of the address translation storage.

In some embodiments the address translation circuitry is responsive to the overlap condition, when the invalidation request is received whilst the validity check process is ongoing, to restart the validity check process.

In some example embodiments described there is a method of address translation comprising: performing first address translations from a first addressing scheme to a second addressing scheme and performing second address translations from the second addressing scheme to a third addressing scheme; storing multiple entries in address translation storage, each entry to store merged address translation information, wherein the merged address translation information indicates an input address region of the first addressing scheme and an output address region of the third addressing scheme; holding a set of counter values in a set of counters; when creating an entry in the address translation storage, storing the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and storing the entry comprising a first counter value of the first counter and a second counter value of the second counter; in response to a first addressing scheme invalidation request specifying a first addressing scheme invalidation context modifying the value of at least one counter of the set of counters in dependence on the first addressing scheme invalidation context and in response to a second addressing scheme invalidation request specifying a second addressing scheme invalidation context modifying the value of at least one counter of the set of counters in dependence on the second addressing scheme invalidation context; and in response to a validity check trigger performing a validity check process in which the entry in the address translation storage is determined to be invalid when either the first counter value does not match a current value of the first counter or the second counter value does not match a current value of the second counter.

Particular embodiments will now be described with reference to the figures.

FIG. 1 illustrates a data processing apparatus 100 in accordance with one embodiment. The apparatus is arranged to perform address translations between different addressing schemes. For example, in some embodiments the apparatus 100 may be provided in the form of a memory management unit (MMU) serving memory access requests from one or more master devices in a wider data processing system. The apparatus 100 comprises address translation circuitry 101, which in the illustrated example performs address translations between a first (input) addressing scheme, a second (intermediate) addressing scheme, and between the intermediate (second) addressing scheme and a third (output) addressing scheme. For example an operating system of the data processing system which comprises the apparatus 100 may manage translations from virtual addresses (VAs) to intermediate physical addresses (IPAs) and a hypervisor may manage mappings from the IPAs to physical addresses (PAs). Thus the apparatus 100 is responsive to translation requests received both from the operating system to perform virtual to intermediate physical address (VA2IPA) translations and is also responsive to address translation requests from a hypervisor to perform intermediate physical address to physical address (IPA2PA) translations. The apparatus 100 further comprises address translation storage 102 arranged to store address translation information. In particular this address translation information corresponds to the VA2IPA and IPA2PA mappings between the addressing schemes which the address translation circuitry 101 performs. Address translation storage 102 may for example be provided in the form of a translation lookaside buffer (TLB) in the example embodiment of the apparatus 100 being an MMU. The address translation storage 102 only stores a subset of the address translation mappings which the address translation circuitry 101 handles, and these mappings are defined and stored in memory (not shown). In a manner with which one of ordinary skill in the art will be familiar, when the address translation circuitry 101 is required to perform a given translation and the required mapping is not currently stored locally (in the address translation storage 102), a page walk process is initiated in order to retrieve the required translation from a page table stored in memory.

A particular feature to note with respect to the storage translation information in the address translation storage 102 is that each entry in the address translation storage 102 is arranged to store merged address translation information, allowing a direct translation from an input (e.g. VA) address into an output (e.g. PA) address. In addition to the translation information, each entry stores counter information relating to the counters 103 which also form part of the apparatus 100. The counters 103 provide a set of counters arranged to hold respective values and when an entry in the address translation storage 102 is created indications of selected counters from the set of counters 103 and their current values are stored as the counter information in the entry. Thus within a given entry identification information for two counters and their respective values are stored, the first being selected in dependence on first context information for translation between the input addressing scheme and the intermediate addressing scheme (e.g. VA2IPA) and the second being selected in dependence on second context information for translation of the intermediate addressing scheme into the output addressing scheme (e.g. IPA2PA). The corresponding counter value for each counter is stored in association with these counter identifiers. The set of counters 103 from which the two counters are selected may be a single set of counters allowing the first and second counters to be selected from amongst any of them or in the example illustrated in FIG. 1 two sets of counters may be defined, where the first counter is selected from the first set of counters and the second counter is selected from the second set of counters. Generally, the counter for each translation level is selected in dependence on the information available to the address translation circuitry relating to the mapping concerned. More specifically the counter for each translation level may, for example, be selected by computing a hash of the information required to perform a look up for that translation level for invalidation in the address translation storage 102. FIG. 1 is described with respect to only two stages of translation (VA2IPA and IPA2PA), but translation information for more than two translation stage may be merged in to the address translation storage entries in other examples.

The address translation circuitry 101 is also responsive to invalidation requests relating to address translation mappings. Invalidation requests may be received with respect to either the input addressing scheme or the intermediate addressing scheme, e.g. as a virtual address invalidation from the operating system or as an intermediate physical address invalidation from a hypervisor. In response to an invalidation request the address translation circuitry 101 increments at least one counter of the set of counters 103. The counter which is incremented is selected in dependence on the invalidation context. It will be understood therefore that the particular embodiment described uses incrementing counters, but an alternative embodiment may equally well use a system of decrementing counters. Indeed all of the particular embodiments shown in the figures herein are, merely for the sake of simplicity, described in terms of incrementing counters, but may equally well be implemented using decrementing counters. Subsequently, when a lookup for a translation using the input addressing scheme (e.g. virtual addressing) is performed, an entry in the address translation storage 102 has its validity determined (in addition to any other validity scheme which may be implemented, e.g. individual entries may be explicitly marked as valid or invalid) with reference to the counter information stored in that entry and the current counter values of the set of counters 103. An entry in the address translation 102 is determined to be valid if all the counter values stored in association with that particular entry match the current counter values 103.

Figure 2:
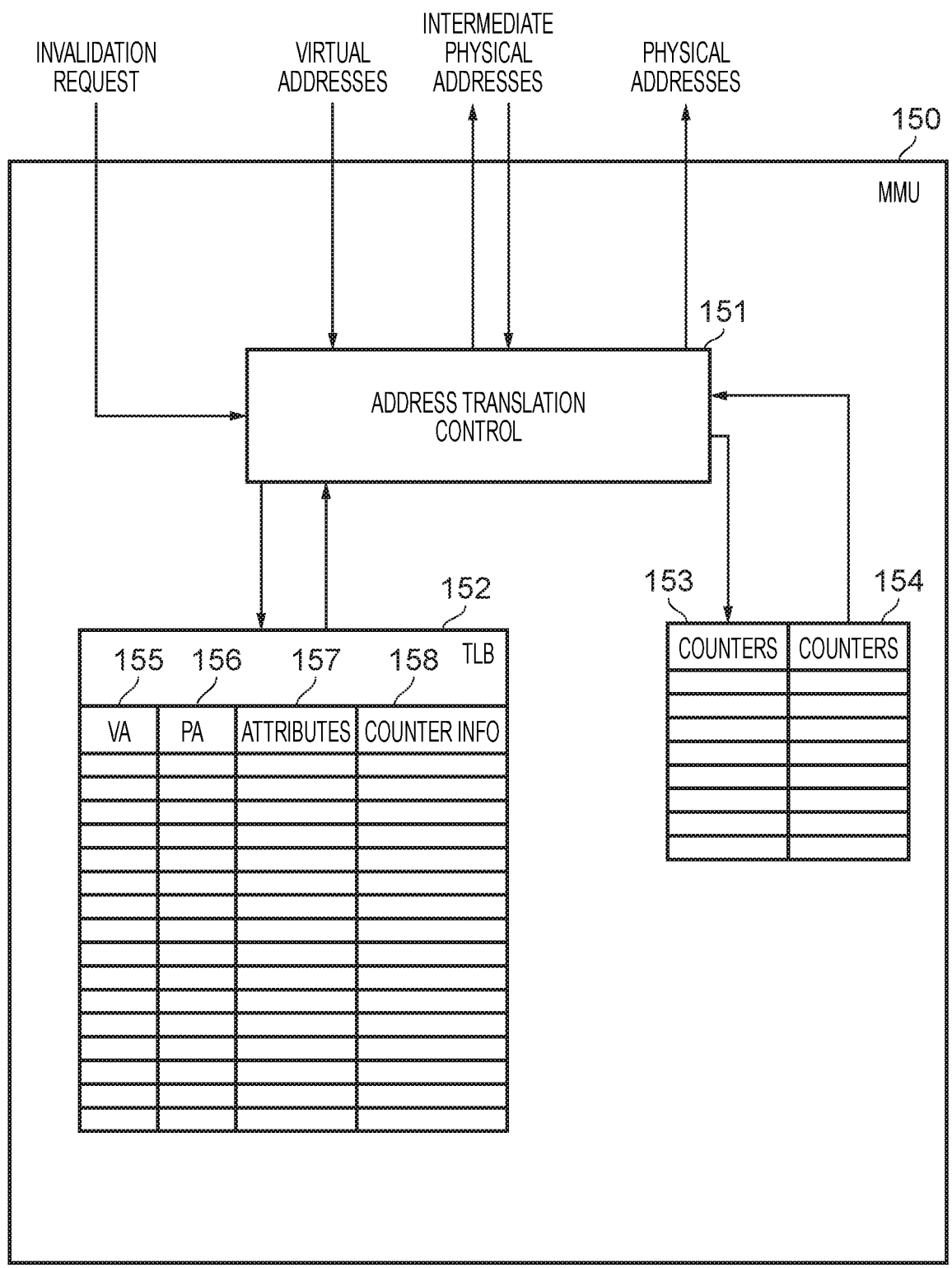
FIG. 2 schematically illustrates a memory management unit comprising address translation control circuitry and address translation storage in an example embodiment.

FIG. 2 schematically illustrates an apparatus 150 in an example embodiment in the form of a memory management unit (MMU). The MMU 150 comprises address translation control circuitry 151 which performs address translations with reference to address translation information stored in a TLB 152 and with reference to sets of counters 153 and 154. The address translation control circuitry 151 is arranged to perform address translations between virtual addresses and intermediate physical addresses and between intermediate physical addresses and physical addresses. Moreover, the address translation control circuitry merges translation information for these two sets of translation type and stores merged translation information in the TLB 152, such that in response to a virtual address the address translation control circuitry 152 can directly generate a physical address. When an entry is created in the TLB 152 the address translation control 151 selects a first counter from the first set of counters 153 by computing a hash of the information required to lookup a virtual address translation in the TLB 152. Similarly the address translation control 151 selects a second counter from the second set of counters 154 by computing a hash of the information required to lookup an intermediate physical address translation in the TLB 152. Identifiers and current values of the two counters thus selected are then stored in the counter information 158 of the TLB entry created in association with the virtual address information 155 and physical address information 156 defining the merged mapping and the entry may further comprise further attributes 157 (e.g. permissions etc.). In response to an invalidation request the address translation control circuitry 151 performs the same counter selection procedure with respect to the relevant invalidation level, and causes the counter selected to be incremented.

Figure 3:
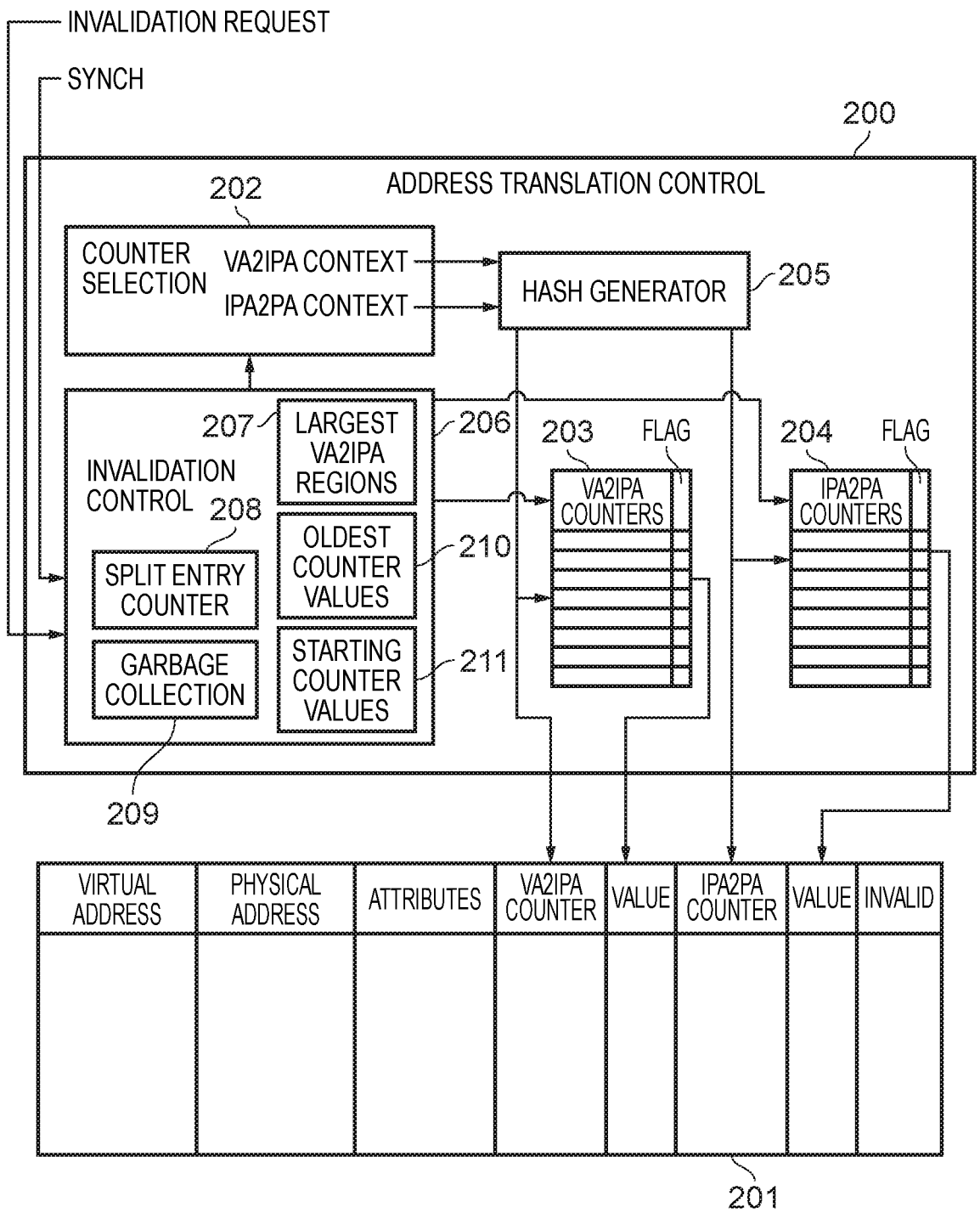
FIG. 3 schematically illustrates further detail of address translation control circuitry and address translation storage in an example embodiment.

FIG. 3 schematically illustrates address translation control circuitry 200 and address translation storage 201 in one example embodiment. These may for example correspond to the address translation circuitry 101 and address translation storage 102 in the example of FIG. 1, the address translation control 151 and the TLB 152 in the example of FIG. 2, or may form part of other apparatus examples. The detail of the address translation control 200 shown in FIG. 3 focuses in particular on the manner in which invalidation requests are processed. The address translation control circuitry 200 comprises counter selection circuitry 202 which makes use of the VA2IPA context and the IPA2PA context in order to select counters. The address translation control circuitry 200 comprises a first set of (VA2IPA) counters 203 and a second set of (IPA2PA) counters 204. Selection of a given counter from each of these two sets of counters is performed making use of the hash generator circuitry 205 forming part of the address translation control circuitry 200. The counter selection circuitry 202 provides the hash generator 205 with its input, namely either the VA2IPA context or the IPA2PA context, and using this information a hash value is generated enabling a counter to be selected. The address translation control circuitry 200 uses this procedure to select a counter from the set of counters 203 and a counter from the set of counters 204 when an entry is created (allocated) in the TLB 201 and an indication of each selected counter, together with its current value, are stored in the entry created. The number and range of the counters is implementation dependent. An example implementation for the two levels of translation illustrated (i.e. VA2IPA and IPA2PA) has 8 counters of 1 bit each for each translation level (total 16 instances of 1 bit counters), and thus stores 2 bits (1 bit for each counter selected) of additional information in each TLB entry tag.

The address translation control circuitry 200 further comprises invalidation control circuitry 206 which also makes use of the counter selection circuitry 202 and the hash generator 205 for counter selection. The invalidation control circuitry 206 can respond to an invalidation request in a variety of ways, some of which comprise causing at least one counter or the counters 203, 204 to be incremented in response to the invalidation request. One particular situation in which the invalidation control circuitry does not cause any of the counters 203, 204 to be incremented in response to the invalidation request is when a region size specified for a virtual address invalidation is known to be the smallest region size used for VA2IPA mappings. In the illustrated example this is a 4 kB region, corresponding to a single 4 kB page in memory. For such invalidations, the smallest region size usage means that a virtual address lookup can be performed in the TLB to see if there is a cached entry for the virtual address invalidated. If there is it can be directly (explicitly) invalidated. It is to be noted that this approach relies on all other translation levels using the same or larger granule as the VA2IPA mapping. If another translation level (i.e. IPA2PA in the illustrated example) uses a smaller granule, then the counter mechanism should be invoked, since more than one mapping at that other level could correspond to the VA2IPA mapping.

The region sizes may be hierarchical (i.e. there is a page table hierarchy) and multiple region sizes may be invalidated in response to a single invalidation request (e.g. a TLB invalidation instruction is executed on a CPU). For example, for a translation stage with address 0x8765_4321, for a 4 kB granule of region size this would result in the following invalidation operations (also subject to the correct context):

Invalidation of the 4 kB region starting at address 0x8765_4000

Invalidation of the 2 MB region starting at address 0x8760_0000

Invalidation of the 1 GB region starting at address 0x8000_0000

Invalidation of the 512 GB region starting at address 0x0

Note, it is not necessary for all region sizes to be possible, but in some cases all (in this example four) levels of the page table hierarchy are used.

The invalidation control 206 may track the VA2IPA region sizes it encounters per context and when this is the case storage 207 is provided for this purpose. Reference to these stored sizes can then be made to determine, for a given invalidation request, if the address translation control has previously encountered any larger VA2IPA mappings for a given context. If it has not then direct invalidation by TLB lookup can be carried out.

Another approach to the tracking of region sizes that may be implemented by the invalidation control 206 is the tracking of "split" entries, i.e. where a TLB entry is created mapping to a smaller VA ranges than the stage 1 translation itself maps to. Conversely, a translation where both stage 1 and stage 2 translations use the same regions size (e.g. 2 MB) can still be invalidated through TLB lookup rather than counter increment. The invalidation control 206 can be provided a split entry counter 208 can be used to track when such "split" entries are created and removed, and if the counter is currently zero when an invalidation request is received then a TLB lookup can be used for the invalidation. Hence the split entry counter 208 is incremented when a "split" entry is created in TLB and is decremented when a "split" entry is evicted or invalidated.

The sets of counters 203 and 204 are shown in FIG. 3 to further comprise a settable flag for each counter. The provision of these flags can be used to avoid one or more of the counters being incremented many times in succession. This could for example otherwise result when many TLB invalidations are issued in a burst (e.g. when unmapping a large buffer). Thus instead of incrementing a selected counter the invalidation control 206 can cause the flag for the counter to be set (or to remain set if it is already set). Thereafter the actual counter update is deferred until a SYNCH request is received. Hence, when a SYNCH request is issued the address translation control increments all counters with the flag set before replying to the SYNCH request.

The invalidation control 206 is further tasked with administering a garbage collection process, for which garbage collection circuitry 210 is provided. Such a garbage collection process is needed, because the range of the counters 203, 204 is finite and if a given counter wraps then old invalid TLB could incorrectly become valid again. To avoid this, after a counter has been incremented the address translation control may be configured to perform garbage collection on the invalid TLB entries. This involves inspecting each TLB entry, and if the entry is indicated as invalid when comparing it to current counter values then it is marked as explicitly invalid. To support this operation the address translation circuitry may track additional information for each counter, namely a) the oldest potential value of any TLB entry mapping to the counter, and b) the counter value when the garbage collection sweep was started. In the example of FIG. 3, storage for these oldest counter values 210 and starting counter values 211 is provided. When the garbage collection completes, the oldest potential value for each epoch counter is set to what the epoch counter value was when the garbage collection was started. If the limit of a counter is reached (i.e. further increment of the counter would cause an invalid entry to become valid again) while a garbage collection is in progress, then the invalidation cannot complete (e.g. this may be in response to a SYNCH request) until the garbage collection is complete. In this situation the invalidation can be delayed until the garbage collection completes. The garbage collection may also be restarted.

Figure 4:
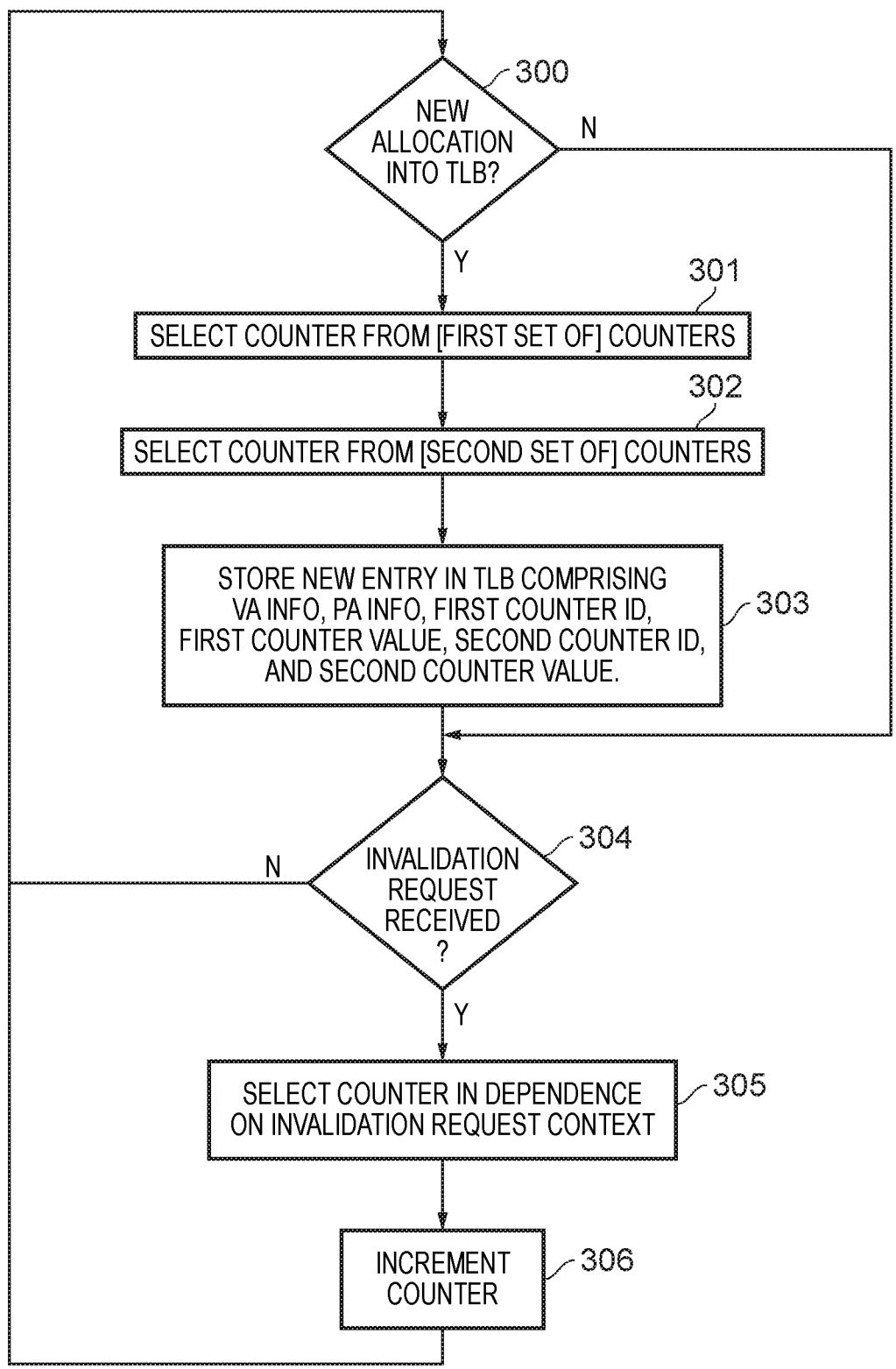
FIG. 4 is a flow diagram showing a sequence of steps which are taken according to the method of one embodiment when a new entry is created in address translation storage.

FIG. 4 is a flow diagram showing a sequence of steps which are taken according to the method of one embodiment when a new entry is to be made (allocated) into the address translation storage (e.g. a TLB). The flow can be considered to begin at step 300 where it is determined whether a new allocation into the address translation storage (TLB) is required. This occurs when a lookup for a given mapping in the TLB has resulted in a miss and a page walk process has retrieved the necessary translation information from page tables in memory and a new entry in the TLB merging mappings for two translation levels is to be made. When this is the case the flow proceeds to step 301 where a first counter is selected from the set of counters available. It is to be noted that in steps 301 and 302 the "first set of" and "second set of" is presented in parentheses since in some embodiments only one set of counters is provided from which both the first and second counter selected at steps 301 and 302 are chosen, whereas in other embodiments a dedicated set of counters is provided for each. Accordingly, at steps 301 and 302 a first and second counter are selected. Then at step 303 the new entry in the TLB is created comprising the required virtual address information, physical address information, an identifier of the first counter, the current value of the first counter, an identifier of the second counter, and the current value of the second counter. The new merged entry is thus complete. Returning to a consideration of step 300, when no new allocation to the TLB is required the flow proceeds directly to step 304. Equally, following step 303 the flow proceeds to step 304, where it is determined if an invalidation request has been received. If it has not then the flow returns to step 300. On receipt of an invalidation request then the flow proceeds to step 305, where a counter is selected in dependence on the invalidation request context. Specifically, the counter is selected in dependence on the address translation stage, i.e. whether the invalidation request is defined in terms of the virtual addressing scheme or the intermediate physical addressing scheme, and in dependence on the further invalidation context information available. Then at step 306 the counter thus selected is incremented and the flow returns to step 300.

Figure 5:
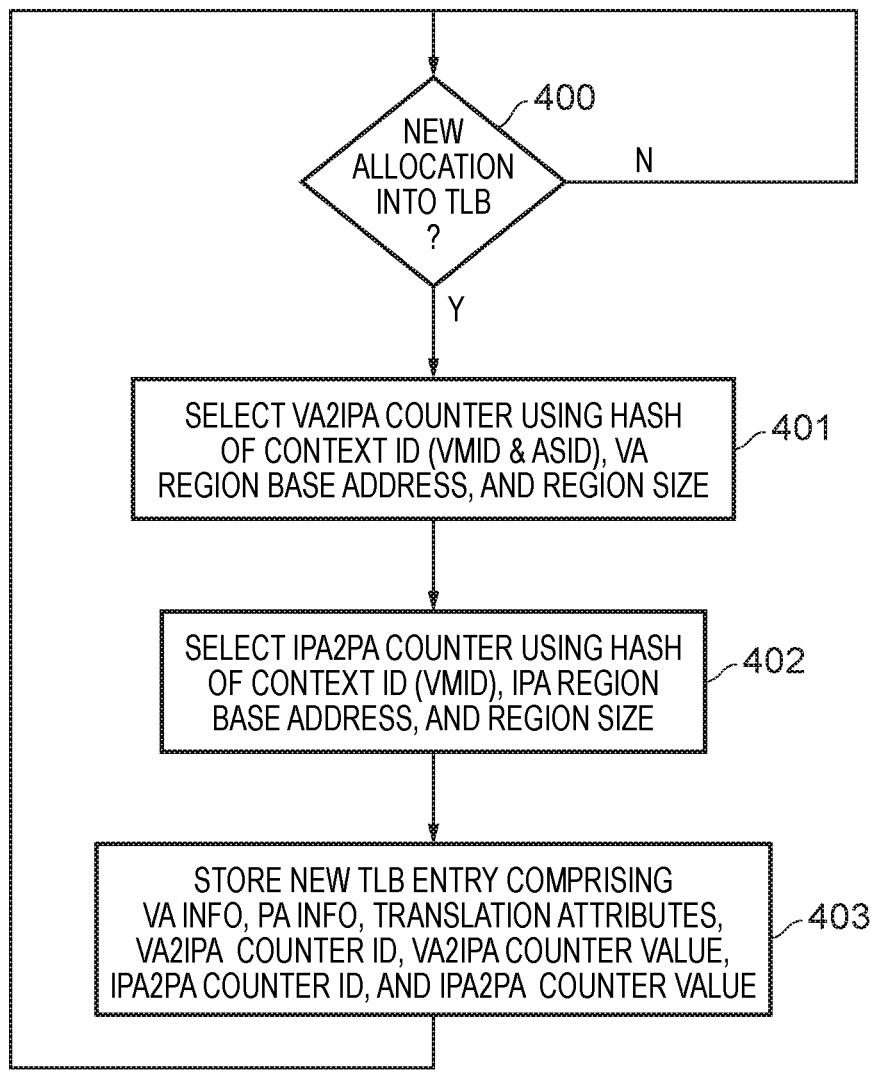
FIG. 5 is a flow diagram showing a sequence of steps which are taken according to the method of one embodiment when a new entry is made in address translation storage.

FIG. 5 is a flow diagram showing a sequence of steps which are taken according to the method of one example embodiment when the present techniques are implemented in an MMU comprising a TLB. The flow can be considered to begin at step 400 where it is determined if a new allocation is to be made into the TLB, i.e. if a merged entry is to be created. The flow waits at step 400 until this is the case. When this is the case the flow proceeds to step 401 where firstly, on the basis of the virtual addressing scheme context, a first (VA2IPA) counter is selected. This is done by generating a hash the context identifiers (e.g. VMID and ASID), a specified virtual address region base address and a specified region size. Next at step 402 a second (IPA2PA) counter is selected using a hash of the intermediate physical address context identifier (e.g. VMID), IPA region base address, and a region size. Then finally at step 403 the new TLB entry is constructed and stored comprising the required virtual address information and physical address information allowing the merged translation (i.e. directly from virtual address to physical address) to be carried out along with any appropriate translation attributes. The entry further comprises the selected VA2IPA counter identifier and its current value and the selected IPA2PA counter identifier and its current value. The flow then returns to step 400.

Figure 6:
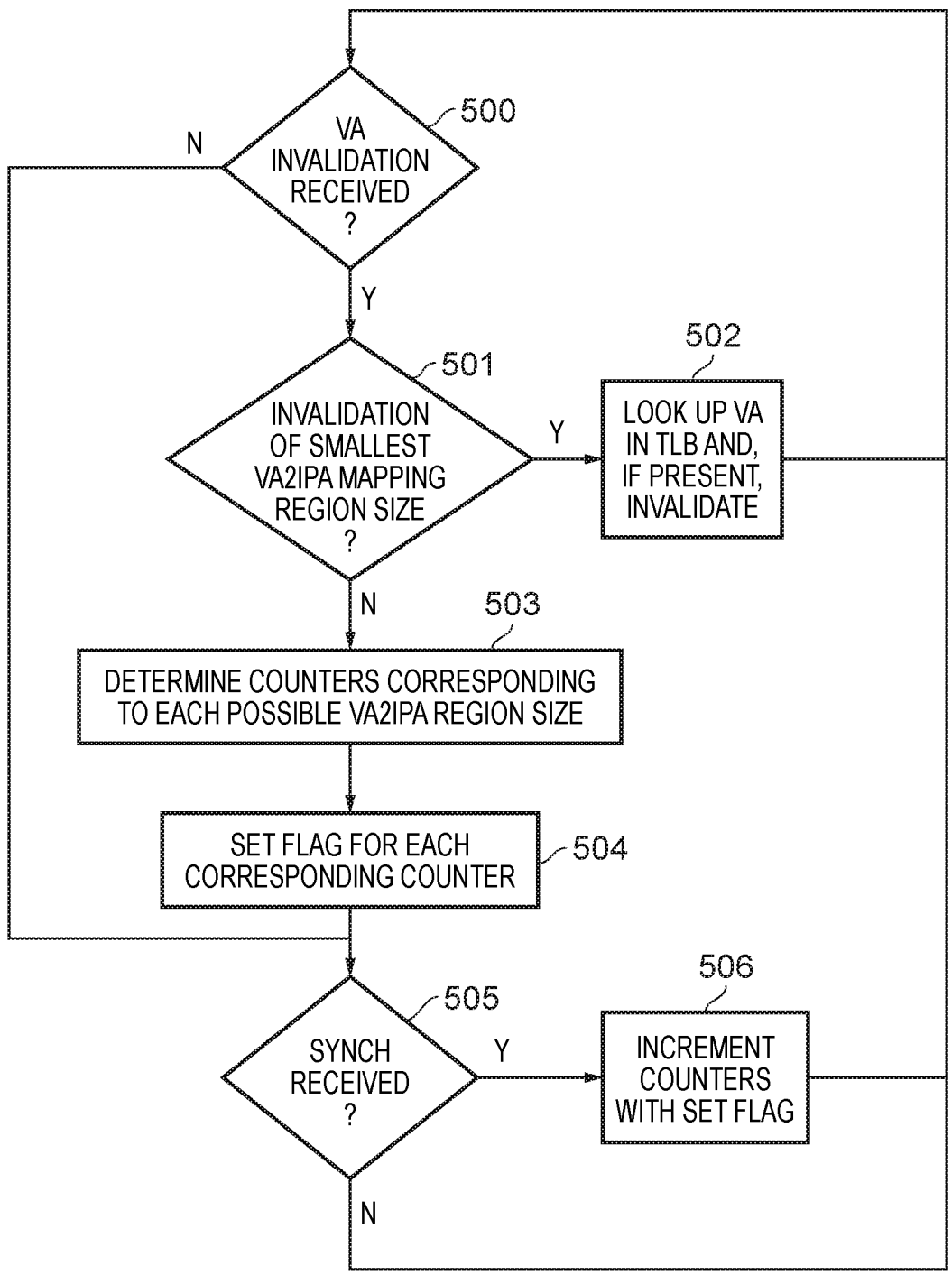
FIG. 6 is a flow diagram showing a sequence of steps which are taken according to the method of one embodiment when a virtual address invalidation request is received.

FIG. 6 is a flow diagram showing a sequence of steps which are taken when a virtual addressing scheme invalidation request is received in example embodiments. The flow can be considered to begin at step 500 where it is determined if a virtual addressing scheme invalidation request has been received. When it is the flow proceeds to step 501 where it is determined if the invalidation request relates to the smallest defined VA2IPA mapping region size used. When this is the case the flow proceeds to step 502 and a lookup using the virtual address information is performed in the TLB to see if there is a cached entry for the virtual address invalidated, and, if it is present, it is invalidated. The flow then returns to step 500. If however the region size is not known, or it is known to be larger than the smallest defined VA2IPA mapping region then the flow proceeds to step 503 where the available invalidation information is used to determine the counters corresponding to each possible VA2IPA region size. Then at step 504 flags for each corresponding counter thus identified are set (indicating that an increment for each of these counters is pending). The flow then proceeds to step 505 where it is determined if a synchronisation ("synch") request has been received. If it has not then the flow returns directly to step 500. If however such an unprocessed request has been received then the flow proceeds to step 506 where each of the counters in the set of counters which have a set flag are then incremented. The flow then proceeds to step 500. Finally returning to a consideration of step 500 itself when no virtual address invalidation request is currently pending then the flow can proceed (via the no path) to step 505 for any pending synchronisation request to be handled.

Figure 7:
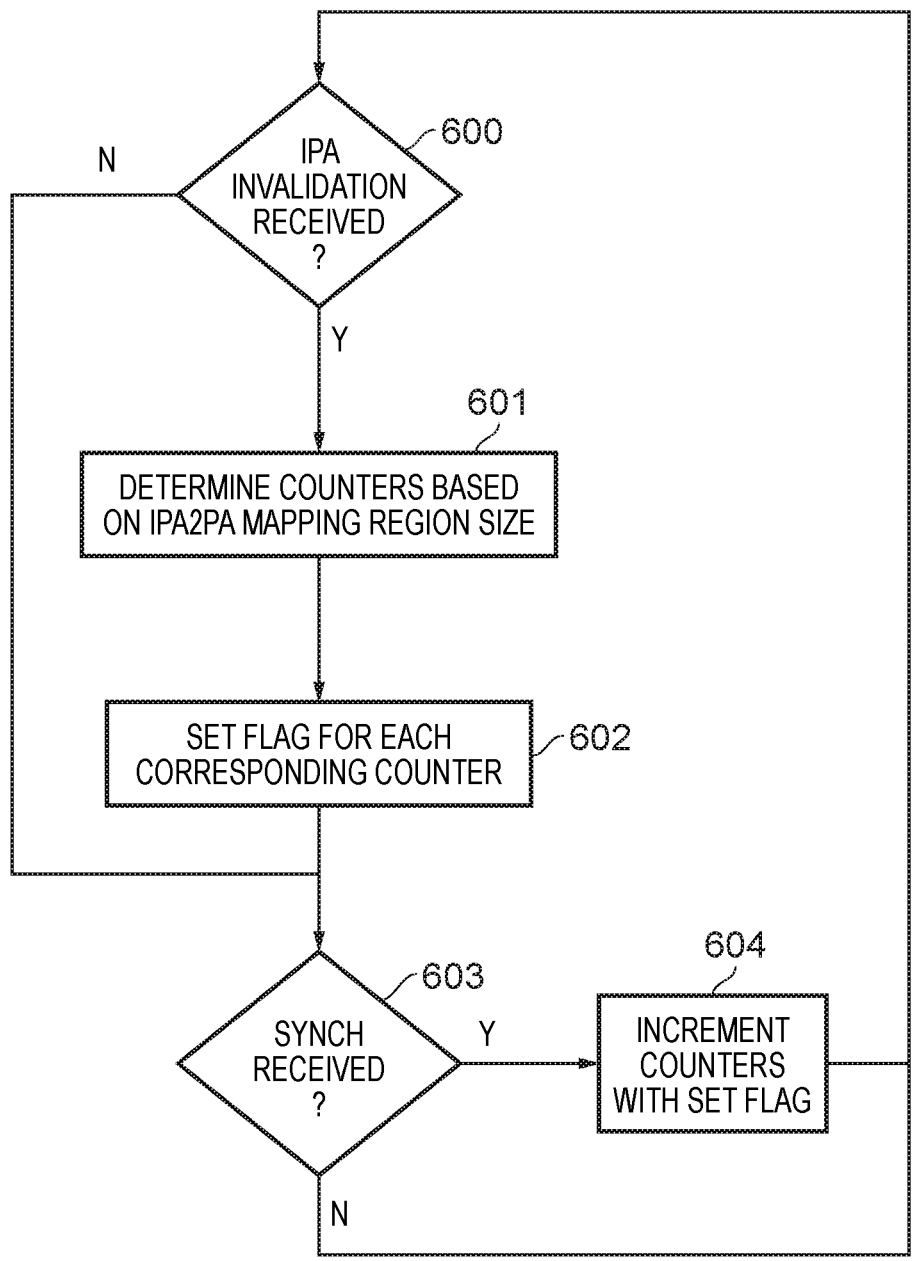
FIG. 7 is a flow diagram showing a sequence of steps which are taken according to the method of one embodiment when an intermediate physical address invalidation request is received.

FIG. 7 is a flow diagram showing a sequence of steps which are taken according to the method of one embodiment when an intermediate physical address invalidation request is received. The flow can be considered to begin at step 600 where it is determined if an intermediate physical address invalidation request has been received. When such a request is received at step 601 the corresponding counter or counters based on the IPA2PA mapping region size (of the invalidation request) are determined, and then at step 602 the flag is set for each corresponding counter. It is then determined at step 603 if a synchronisation request for the counters is pending and when it is then the flow proceeds via step 604 for each counter with its flat set to be incremented. Otherwise the flow proceeds directly to step 600. Finally, returning to a consideration of step 600; where no intermediate physical address invalidation request is currently pending and the flow (N path) can proceed to step 603 for any pending synchronisation path to be serviced.

Figure 8:
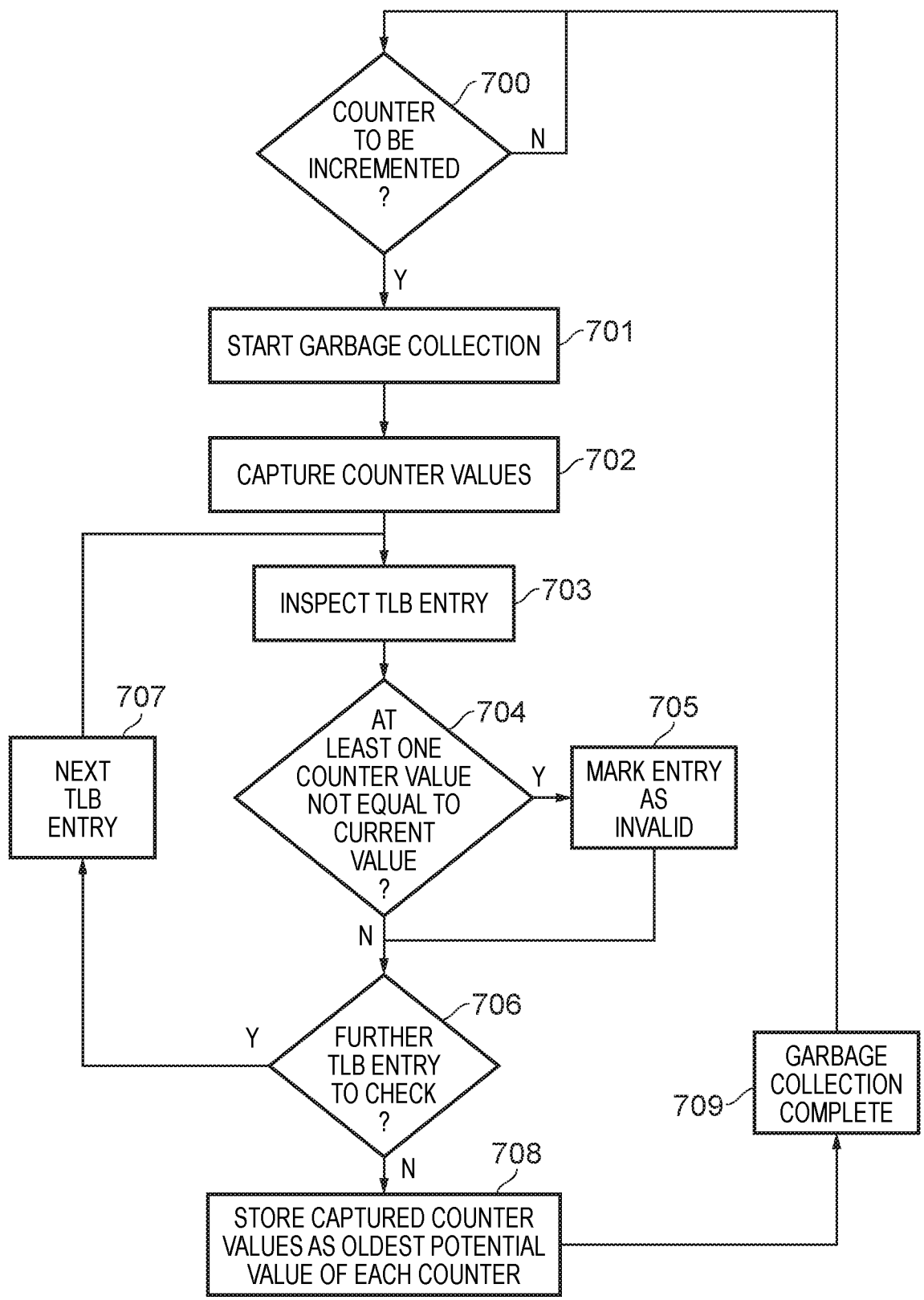
FIG. 8 is a flow diagram showing a sequence of steps which are carried out according to the method of one embodiment to implement a garbage collection process.

FIG. 8 is a flow diagram showing a sequence of steps which are taken to implement a garbage collection process in example embodiments. The trigger for the garbage collection process, and indicated by step 700, is that there is a counter of the set of counters which is to be incremented. When this occurs the flow proceeds to step 701 and the garbage collection process starts. At step 702 the current set of counter values is captured and is stored. Each TLB entry is then examined in an iterative process to determine the validity of that entry. At step 703 a (first) TLB entry is inspected. At step 704 it is determined if at least one counter value of the counter values stored in this entry differs from the current value of the corresponding counter(s). If it does then the flow proceeds via step 705 where the entry is explicitly marked as invalid. At step 706 it is determined if there is a further TLB entry to be checked in the process. When there is then via step 707 the next TLB entry is selected to then be examined at step 703. When all TLB entries have been checked then from step 706 the flow proceeds to step 708 and the captured counter values (from step 702) are stored as the oldest potential value of each counter. Use of this value will be explained in more detail with reference to FIG. 10 below. From step 708 the flow proceeds via step 709, completing the garbage collection process, back to step 700.

Figure 9:
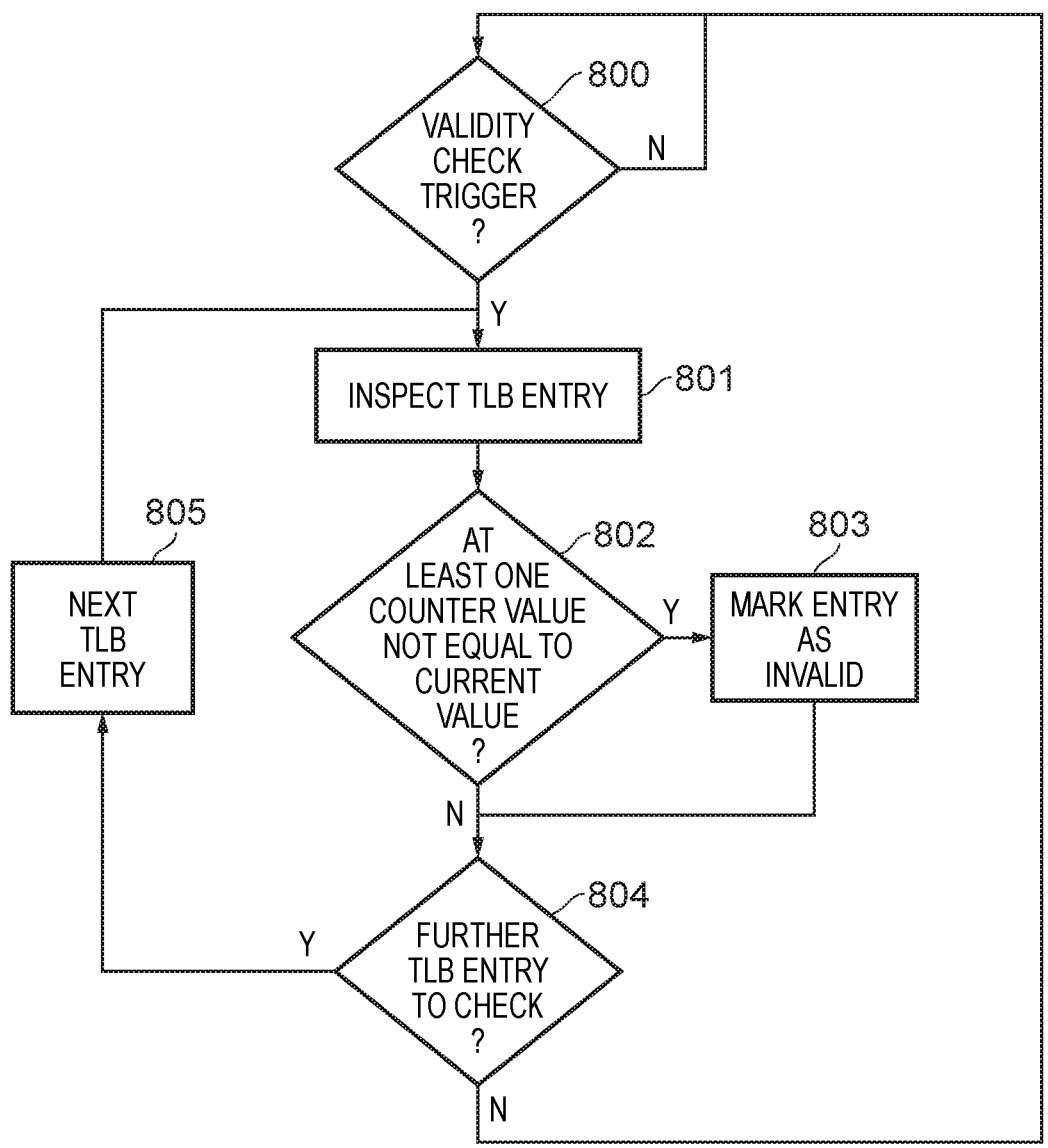
FIG. 9 is a flow diagram showing a sequence of steps which are taken according to the method of one embodiment when the validity of entries in an address translation storage is explicitly checked.

FIG. 9 is a flow diagram showing a sequence of steps which are taken in response to a validity check trigger in some embodiments. The flow can be considered to begin at step 800 where it is determined if a validity check trigger has occurred. As mentioned above the validity check trigger may take a variety of forms, but one validity check trigger for some example embodiments is when a translation look up in a TLB is performed. A validity check trigger may alternatively or in addition be performed as part of a garbage collection process and depending on the system requirements a validity check may be triggered at other junctures in the operation of a data processing system as required. However defined, in response to a validity check trigger the flow proceeds to step 801 where an iterative process of checking the validity of each TLB entry begins and a (first) TLB entry is examined. Then at step 802 it is determined if at least one counter value stored in that TLB entry does not match the current value of the relevant counter(s). This being the case, then the flow proceeds via step 803 where the entry is explicitly marked as being invalid. Otherwise from step 802 the flow proceeds directly to step 804 where it is determined that if there is at least one further TLB entry to check. If this is the case then the flow returns via step 805 to select that TLB entry. Once all TLB entries have been checked then the validity check trigger response is complete and the flow returns to step 800.

Figure 10:
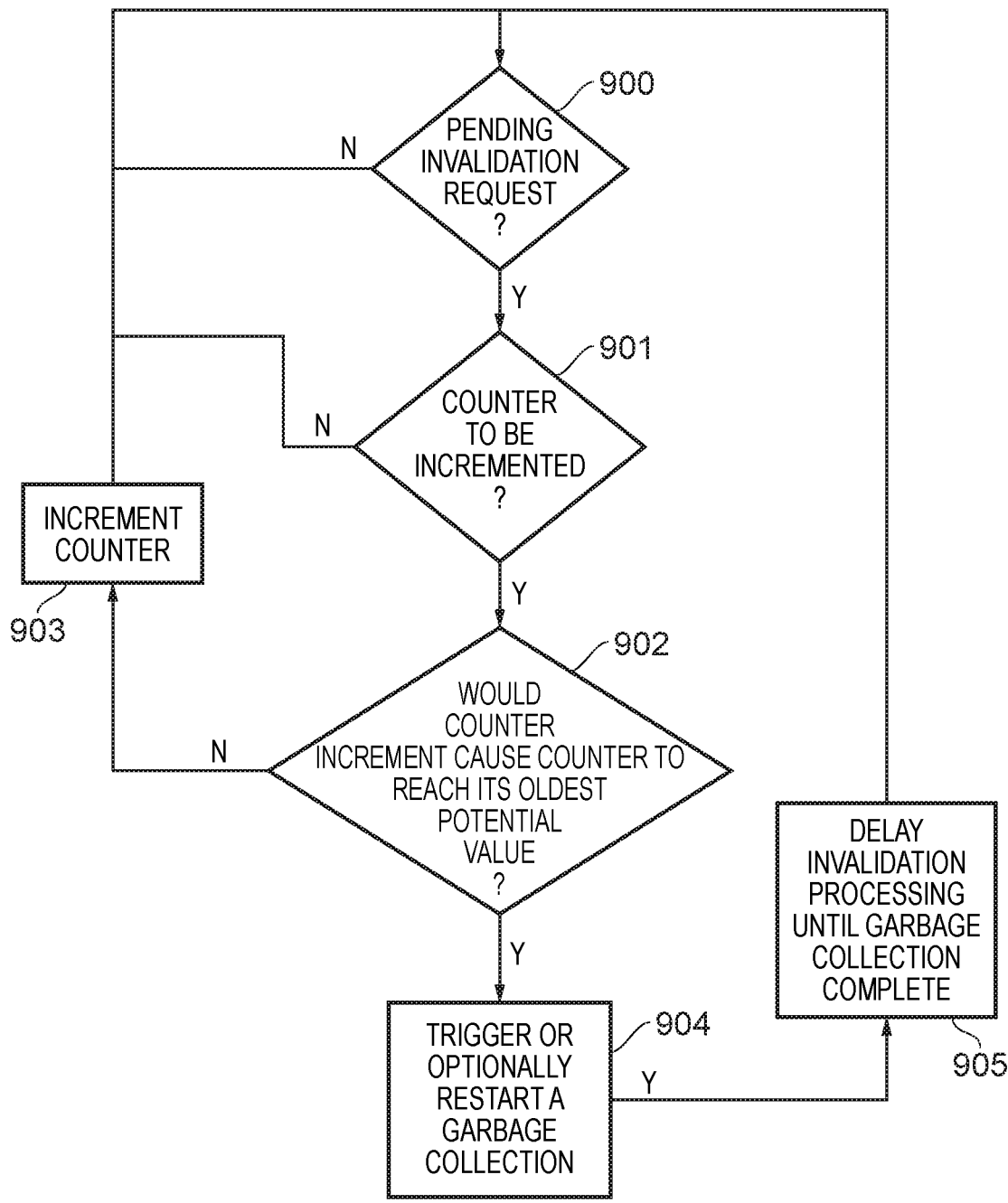
FIG. 10 is a flow diagram showing a sequence of steps according to the method of one embodiment when an invalidation request is to be carried out whilst a garbage collection process is in progress.

FIG. 10 is a further flow diagram illustrating a sequence of steps which are taken in some example embodiments, in particular relating to the interplay between invalidation requests, the incrementing of counters, and a garbage collection process. The flow can be considered to begin at step 900, where it is determined if there is a pending invalidation request to be responded to. Whilst this is not the case the flow loops on itself at this step. When there is an invalidation request to be actioned, the flow proceeds to step 901 where it is determined if there is a counter to be incremented. If there is not then the flow returns to step 900. However, when there is a counter to be implemented, the flow proceeds to step 902 where it is determined if incrementing the counter would cause that counter to reach its oldest potential value (i.e. that captured in step 708 of FIG. 8). If this is not the case then the flow proceeds to step 903 and the increment of the counter is allowed to proceed. However, when this would occur then the flow proceeds to step 904, where a garbage collection process is triggered (or optionally, if a garbage collection process is currently underway, the garbage collection process may be restarted). The flow then proceeds to step 905 where the invalidation processing is delayed until the garbage collection process is complete and the flow returns to step 900 for the invalidation processing (requests) to be reconsidered and handled anew.

In brief overall summary apparatuses and methods for address translation invalidation are provided. In an apparatus having address translation storage which stores merged address translation information for multiple address translation stages, a set of counters are provided to hold a set of counter values. Entries in the address translation storage are stored with identifiers of first and second counters selected from the set of counters in dependence on respective context information for a first stage and a second stage of address translation together with a counter value of each counter. In response to an invalidation request specifying a first or second addressing scheme invalidation context a counter of the set of counters is selected in dependence on the first or second addressing scheme invalidation context and its value is modified. Subsequently an entry in the address translation storage is determined to be invalid when either the first counter value does not match a current value of the first counter or the second counter value does not match a current value of the second counter.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
address translation circuitry to perform first address translations from a first addressing scheme to a second addressing scheme and to perform second address translations from the second addressing scheme to a third addressing scheme;
address translation storage comprising multiple entries, each entry to store merged address translation information, wherein the merged address translation information indicates an input address region of the first addressing scheme and an output address region of the third addressing scheme; and
counter circuitry comprising a set of counters to hold a set of counter values,
wherein the address translation circuitry is arranged, when creating an entry in the address translation storage, to store the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and to store the entry comprising a first counter value of the first counter and a second counter value of the second counter,
wherein the address translation circuitry is responsive to a first addressing scheme invalidation request specifying a first addressing scheme invalidation context to modify the value of at least one counter of the set of counters in dependence on the first addressing scheme invalidation context and is responsive to a second addressing scheme invalidation request specifying a second addressing scheme invalidation context to modify the value of at least one counter of the set of counters in dependence on the second addressing scheme invalidation context,
and wherein the address translation circuitry is responsive to a validity check trigger to perform a validity check process in which the entry in the address translation storage is determined to be invalid when either the first counter value does not match a current value of the first counter or the second counter value does not match a current value of the second counter.

2. The apparatus as claimed in claim 1, wherein the counter circuitry comprises a first set of counters to hold a set of first counter values and a second set of counters to hold a set of second counter values,
and wherein the address translation circuitry is arranged, when creating the entry in the address translation storage, to store the entry comprising the identifier of the first counter selected from the first set of counters in dependence on the first context information and the identifier of the second counter selected from the second set of counters in dependence on the second context information.

3. The apparatus as claimed in claim 2, wherein the counter circuitry comprises a plurality of sets of counters, each to hold a set of counter values,
wherein each set of counters corresponds to a region size defined for translation from the first addressing scheme to the second addressing scheme or for translation from the second addressing scheme to a third addressing scheme.

4. The apparatus as claimed in claim 1, wherein at least one of:
the first context information comprises a first region size of the input address region of the first addressing scheme; and the second context information comprises a second region size of the intermediate address region of the second addressing scheme.

5. The apparatus as claimed in claim 1, wherein at least one of:
the first context information comprises a first addressing scheme base address of the input address region: and
the second context information comprises a second addressing scheme base address of the intermediate address region.

6. The apparatus as claimed in claim 1, wherein at least one of:
the first context information comprises at least one of: a virtual machine identifier and an application space identifier corresponding to the translation of the input address region of the first addressing scheme into the intermediate address region of the second addressing scheme; and
the second context information comprises a virtual machine identifier corresponding to the translation of the intermediate address region of the second addressing scheme into the output address region of the third addressing scheme.

7. The apparatus as claimed in claim 1, wherein the address translation circuitry is arranged, when creating the entry, to generate a first hash value of the first context information and to select the first counter from the first set of counters in dependence on the first hash value,
and wherein the address translation circuitry is arranged, when creating the entry, to generate a second hash value of the second context information and to select the second counter from the second set of counters in dependence on the second hash value.

8. The apparatus as claimed in claim 1, wherein, when the first addressing scheme invalidation context specifies a smallest defined first addressing scheme invalidation region size, the address translation storage is responsive to the first addressing scheme invalidation request to mark entries in the address translation storage comprised in the smallest defined first addressing scheme invalidation region size and as invalid and not to modify the value of the at least one counter of the set of counters.

9. The apparatus as claimed in claim 4, further comprising first addressing scheme region size storage to store a first addressing scheme largest region size, wherein the address translation circuitry is arranged, when creating the entry, to store the first region size in the first addressing scheme region size storage when the first region size is larger than a current first region size stored in the first addressing scheme region size storage,
and the address translation circuitry is responsive to the first addressing scheme invalidation request to mark entries in the address translation storage comprised in the first addressing scheme largest region size as invalid and not to modify the value of the at least one counter of the set of counters.

10. The apparatus as claimed in claim 1, wherein, when the first addressing scheme invalidation context does not specify a first addressing scheme invalidation region size, the address translation circuitry is responsive to the first addressing scheme invalidation request to determine the at least one counter of the set of counters to have its value modified in dependence on each of multiple first region sizes of input address regions of the first addressing scheme defined for the first address translations.

11. The apparatus as claimed in claim 1, wherein, when the second addressing scheme invalidation context specifies a second addressing scheme invalidation region size, the address translation circuitry is responsive to the second addressing scheme invalidation request to determine the at least one counter of the set of counters to have its value modified in dependence on the second addressing scheme invalidation region size.

12. The apparatus as claimed in claim 1, wherein, when the second addressing scheme invalidation context does not specify a second addressing scheme invalidation region size, the address translation circuitry is responsive to the second addressing scheme invalidation request to determine the at least one counter of the set of counters to have its value modified in dependence on each of multiple second region sizes of intermediate address regions of the second addressing scheme defined for the second address translations.

13. The apparatus as claimed in claim 1, further comprising deferral circuitry to defer the value modification of the at least one counter of the set of counters and to defer the value modification of at least one counter of the set of counters until a counter synchronisation signal is received.

14. The apparatus as claimed in claim 13, wherein the deferral circuitry comprises a settable flag for each counter of the first set of counters and of the second set of counters, wherein the deferral circuitry is responsive to a counter modification signal from the address translation circuitry to set the settable flag for a respective counter, and wherein the deferral circuitry is responsive to the counter synchronisation signal to modify values of counters for which the settable flag is set.

15. The apparatus as claimed in claim 1, wherein the validity check trigger comprises a translation lookup request received by the address translation circuitry.

16. The apparatus as claimed in claim 1, wherein the validity check trigger comprises the modification of the value of the at least one counter of the set of counters,
and the address translation circuitry is responsive to the validity check trigger to perform the validity check process for the multiple entries of the address translation storage.

17. The apparatus as claimed in claim 16, wherein each counter of the first set of counters and the second set of counters is arranged to wrap around, further comprising oldest counter value storage and starting counter value storage,
wherein the address translation circuitry is responsive to the validity check trigger to store current values of the first set of counters and the second set of counters in the starting counter value storage before performing the validity check process,
and wherein the address translation circuitry is responsive to completion of the validity check process for the multiple entries of the address translation storage to store content of the starting counter value storage as content of the oldest counter value storage.

18. The apparatus as claimed in claim 17, wherein the address translation circuitry is responsive to an overlap condition, in which modification of the value of a counter in response to an invalidation request would cause the counter to reach its respective value in the oldest counter value storage, to delay the response to the invalidation request until completion of the validity check process for the multiple entries of the address translation storage.

19. The apparatus as claimed in claim 18, wherein the address translation circuitry is responsive to the overlap condition, when the invalidation request is received whilst the validity check process is ongoing, to restart the validity check process.

20. A method of address translation comprising:
performing first address translations from a first addressing scheme to a second addressing scheme and performing second address translations from the second addressing scheme to a third addressing scheme;
storing multiple entries in address translation storage, each entry to store merged address translation information, wherein the merged address translation information indicates an input address region of the first addressing scheme and an output address region of the third addressing scheme;
holding a set of counter values in a set of counters;
when creating an entry in the address translation storage, storing the entry comprising an identifier of a first counter selected from the set of counters in dependence on first context information for translation of the input address region of the first addressing scheme into an intermediate address region of the second addressing scheme and an identifier of a second counter selected from the set of counters in dependence on second context information for translation of the intermediate address region of the second addressing scheme into the output address region of the third addressing scheme, and storing the entry comprising a first counter value of the first counter and a second counter value of the second counter;
in response to a first addressing scheme invalidation request specifying a first addressing scheme invalidation context modifying the value of at least one counter of the set of counters in dependence on the first addressing scheme invalidation context and in response to a second addressing scheme invalidation request specifying a second addressing scheme invalidation context modifying the value of at least one counter of the set of counters in dependence on the second addressing scheme invalidation context; and
in response to a validity check trigger performing a validity check process in which the entry in the address translation storage is determined to be invalid when either the first counter value does not match a current value of the first counter or the second counter value does not match a current value of the second counter.

* * * * *